United States Patent [19]
Braun et al.

[11] Patent Number: 5,265,178
[45] Date of Patent: Nov. 23, 1993

[54] FIBER OPTIC DATA COMMUNICATION SYSTEM

[75] Inventors: Steven W. Braun, Lucadia; Jay A. Eggert, San Diego; Roy L. Eyman, Poway; John D. Hightower, San Diego, all of Calif.

[73] Assignee: Science Applications International Corporation, San Diego, Calif.

[21] Appl. No.: 966,766

[22] Filed: Oct. 26, 1992

[51] Int. Cl.$^5$ .............................................. G02B 6/28
[52] U.S. Cl. ..................................... 385/24; 385/27; 385/28; 385/1
[58] Field of Search ............... 385/29, 27, 28, 32, 385/24, 1, 4, 9, 12, 11, 13

[56] References Cited

U.S. PATENT DOCUMENTS

| | | | |
|---|---|---|---|
| 3,795,433 | 3/1974 | Channin | 385/28 |
| 4,695,123 | 9/1987 | Chang et al. | 385/11 |
| 4,795,233 | 1/1989 | Chang | 385/11 |
| 5,131,060 | 7/1992 | Sakata | 385/28 |

Primary Examiner—John D. Lee
Assistant Examiner—Phan T. Heartney
Attorney, Agent, or Firm—Fitch, Even, Tabin & Flannery

[57] ABSTRACT

A system and method for data communications using a multiplicity of modulators, each of which accept a data input signal and modulate an optical carrier generated by a single optical energy source and propagated along a fiber optic waveguide. The carrier is modulated by the use of a doped polymer contained in the modulators and maintained in contact with the fiber optic waveguide.

9 Claims, 1 Drawing Sheet

FIBER OPTIC DATA COMMUNICATION SYSTEM

The present invention relates to a fiber optic data communication system with an improved method of externally modulating the optical energy propagated through an optical fiber waveguide so as to permit multiple modulator sites to be incorporated along the optical fiber path of propagation while using a single source of optical energy.

BACKGROUND OF THE INVENTION

Prior fiber optic data communication techniques of multiplexing data onto a laser beam propagated in a fiber optic waveguide use two basic methods, direct modulation and external modulation, both of which have been complex and expensive. Direct modulation methods break the integrity of the fiber optic waveguide in the transmission link to introduce additional modulation components. Prior methods using direct modulation require an optical receiver, optical laser transmitter, and complex timing and formatting circuits to accomplish the introduction of additional data onto the laser carrier propagated through the fiber optic waveguide. The optical receiver serves to terminate the fiber optic waveguide and intercept the data stream modulated on the laser carrier. The formatting circuits add off-line external data and the timing regeneration circuits reconstruct the data stream with the additional data multiplexed therein. The reconstructed data is modulated on a new laser carrier generated and retransmitted by the transmitter. Such complex point-to-point segments are expensive and require significant amounts of power for operation. In distributed modulation systems, these factors have seriously limited the number of modulation sites that can be practically incorporated in a communication system where the modulation sites are spatially distributed along a fiber optic waveguide used as a laser transmission line. The power requirements of such systems are particularly important since they place severe operating life limits on remotely deployed portable applications which use batteries. With the complex circuits and significant battery requirements, the weight of such systems is another limiting factor, particularly when the system includes many modulators distributed along the fiber optic waveguide and must be carried by aircraft for deployment. Additionally, the complexity of the circuits reduces the inherent reliability of any such system.

Alternatively, applications of prior fiber optic communications techniques using external modulation have enjoyed only limited success since the techniques have employed inorganic crystal structures to achieve the modulation desired. Potassium dihydrogen phosphate (PDK) and lithium niobate (LiNbO$_3$) crystals are two noncentrosymmetric crystalline structures found to achieve useable performance. The physical characteristics of such modulators limit their application, however. While the lithium niobate crystals offer some performance improvement over the PDK crystals, they are expensive and difficult to manufacture. Additionally, such crystals have characteristics which are less than ideally suited to the application. Their dielectric constants are high, their indices of refraction are not closely compatible with the optical fibers with which they interface, and intimate contact with the fibers is difficult to achieve thereby causing inefficient coupling into the optical fiber waveguide. The crystal structures also represent an optically lossy transmission medium. Such factors contribute to overall inefficient operation, physical limitations, and attendant high costs.

Doped polymers have been investigated as an alternative to the lithium niobate crystals in prior modulators but have failed to achieve performance that would permit their commercial application in optical communication systems. Prior doped polymers have been limited by sensitivity to temperature and subject to poor retention of molecular electrical dipole alignment (poling), resulting in gradual degradation of their noncentrosymmetry over time, thereby losing their electrooptical operating characteristics. Additionally, the dopants have not been absorbed into the polymers in sufficient density and have exhibited less than practical parametric variation from the applied electrical modulating fields.

Accordingly, there is a continuing need for an improved electrooptical modulating system permitting multiple modulator sites in a communication system which overcomes the above described shortcomings of prior art direct and external modulation methods. The present invention satisfies such a need.

SUMMARY OF THE INVENTION

The instant invention incorporates into a communication system, multiple modulator assemblies which individually accept data from external sources at sites located along the length of a fiber optic waveguide. The modulator assembly at each site controls the intensity of light propagated in the fiber optic waveguide without compromising the physical integrity of the optical fiber.

Basically each modulator assembly encloses and helps to retain the physical integrity of a short segment of cable containing the fiber optic waveguide, while maintaining a doped non-linear polymer film in proximity of the fiber core. The doped non-linear polymer film has an index of refraction which, under quiescent conditions, essentially matches the index of refraction of the fiber optic waveguide cladding, thereby optimizing light containment. An external electrical data signal is applied to the modulator assembly, producing a change of refractive index in the doped polymer. The doped polymer, by means of changing refractive index, causes light to escape from the fiber core in an amount proportional to the applied electric field. The optical carrier, a continuous wave signal injected at the fiber end, is thus modulated.

More specifically, each modulator assembly makes use of a noncentrosymmetric glassy polymer contained by a silicon chip. A channel is arranged longitudinally through the silicon chip, with sufficient width and depth to snugly receive the optical fiber including the cladding which encloses and provides the protective covering for the fiber optic waveguide. The optical fiber is fitted into the channel with only as much cladding material removed parallel to the longitudinal axis of the cable to expose a short length of the fiber optic waveguide while retaining the remainder of the circumferential cladding material to maintain cable integrity and strength. A cover-like silicon overlay containing the doped polymer film encloses the exposed fiber optic waveguide cable within the silicon chip with conductive strips exposed to accept input data signals. An alternative assembly would utilize cylindrical lithography to circumferentially etch the cladding of the optical fiber to a depth that would expose the optical waveguide. The doped polymer would then be deposited within the circumferential etching and perform as described. Data signal voltage is provided from the external source to the modulator via the two conductive strips, producing the electric field between them and thereby through the doped polymer film. The resultant electric field in the doped polymer film is translated into an equivalent change in the index of refraction of the doped polymer. The change in the index of refraction causes laser optical energy to be proportionally absorbed from the fiber optic waveguide as the light propagates through the area of contact between the doped polymer film and the fiber optic waveguide. The absorption represents a reduction in the intensity of the propagated optical energy, thereby producing modulation of the optical carrier.

DESCRIPTION OF THE PREFERRED EMBODIMENT

Figure 1:
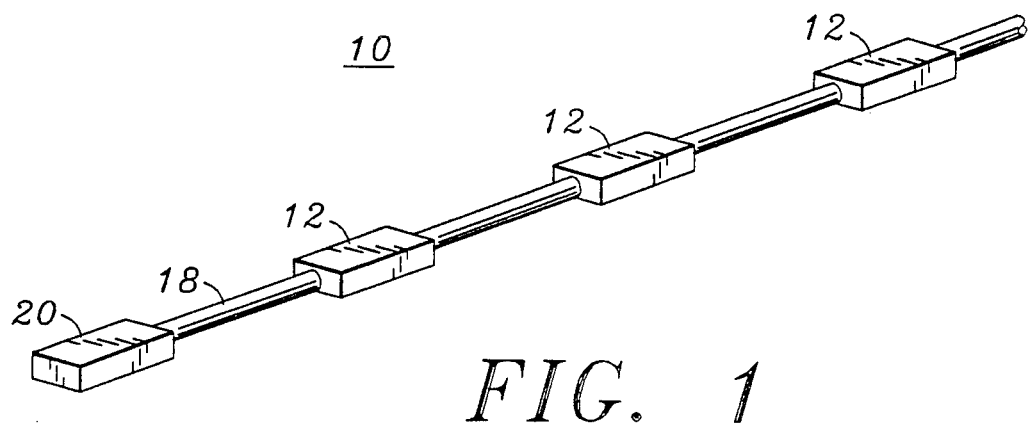
FIG. 1 is an illustration of a preferred embodiment of the communication system showing the positioning of modulator assemblies at sites along the length of a cable enclosing a fiber optic waveguide.
Figure 2:
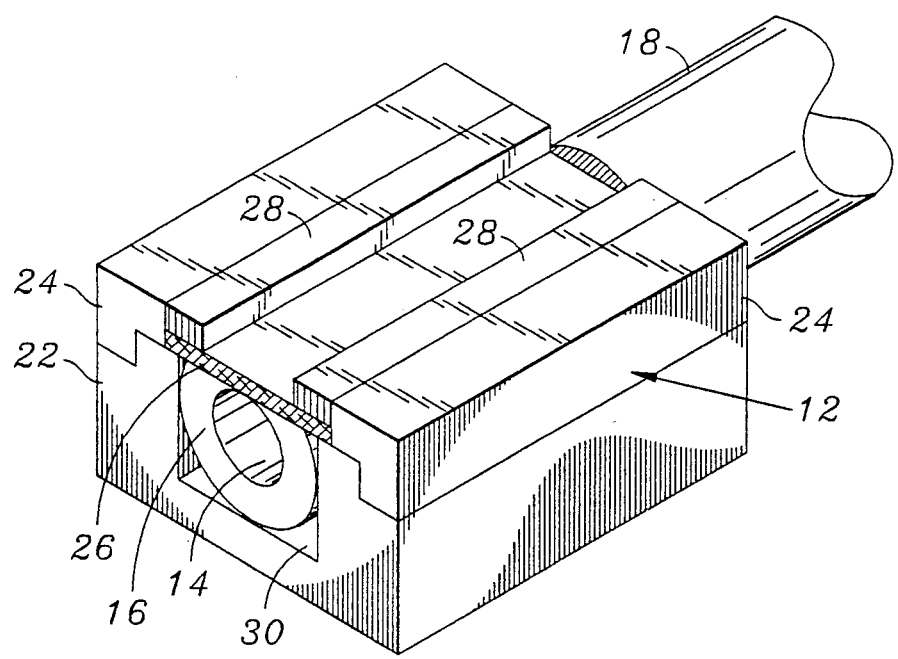
FIG. 2 is a section view of a perspective representation of a preferred embodiment of the electrooptical modulator assembly showing the method of attachment to the fiber optic waveguide cable assembly and the relationship of the principal elements of the instant invention.

As shown in FIG.1, the communication system 10 of the instant invention includes a multiplicity of individual electrooptical modulator assemblies 12 installed along a fiber optic waveguide 14 (FIG.2). The waveguide 14 is enclosed within and protected by cladding 16 (FIG.2) in a cable 18 and driven by a single laser source 20.

As shown in FIG.2, each modulator assembly 12 comprises a rectangular silicon block 22 in which a channel 30 has been formed, centered in the block and along its longitudinal axis. For each modulator assembly, a segment of the cable cladding material 16 is removed along the cable 18 for a length slightly less than the length of the silicon block 22 and to a sufficient depth so as to expose a narrow circumferential surface of the fiber optic waveguide 14 contained therein. The channel 30 is of sufficient depth to permit the cable 18 containing the exposed portion of the fiber optic waveguide 14 to snugly fit therein. Thus positioned, the exposed portion of the waveguide 14 is captured and fully conformal within the modulator silicon body 22, with the modulator body extending beyond the exposed waveguide 14 area in either direction along the cable 18. The exposed segment of the fiber optic waveguide 14 segment is enclosed by a silicon cover 24 which matches the length of the modulator body 22 and which contains the electroactive doped polymer film 26, maintained in intimate contact with the fiber optic waveguide 14 along its entire exposed length. As will be described, the length of the exposed fiber optic waveguide 14 and of the doped polymer film 26 are chosen to provide a sufficient area of contact between the film and the waveguide 14 to produce a desired depth of modulation. Further, outer lateral edges of the silicon body 22 are offset parallel to the longitudinal axis of the cable 18 and the length of the silicon body 22 of the modulator 12, with similar offsets in the silicon cover 24 to provide lateral stability of the cover 24 through the resultant interlocking fit between the modulator body 22 and the modulator cover 24. Any alternative method of interlocking the cover 24 and body 22 of the modulator 12 may be used to assure no relative movement of the assembled components.

As illustrated in FIG.2, two conductive strips 28 are bonded to the modulator cover 24, extending along the modulator cover 24 parallel to the longitudinal axis of the cable 18. The conductive strips 28 accept the data signal voltage applied between them in a connectorless fashion and translate that signal voltage into an electric field applied across the electroactive doped polymer film 26. The width, length, and spacing of the conductive strips 28 can be tailored to the character of the applied signal. For very high frequency signals, the strips 28 can function as sections of a transmission line. The strips 28 can be bonded directly to the doped polymer film 26 or to the semiconductor cover, depending on the function of the semiconductor cover. If the applied data signals are not of sufficient amplitude to produce the desired depth of modulation, the adjacent silicon material of the cover 24 can be so doped as to form an amplifier between the conductive strips 28 and the captive electroactive doped polymer film 26.

Generally speaking, the electroactive doped non-linear optical polymer film 26 changes its optical properties during the application of the electrical field to effect a modulation of the carrier signal transmitted by the fiber optic waveguide 14 from the source 20. Preferably, the doped polymer used in the film 26 exceeds prior doped polymers in certain significant parameters for the instant application. First, prior doped polymers were not sufficiently stable nor did they provide the range of optical control for practically achievable input signal levels. In contrast, the instant polymer features a glass transition temperature of approximately 150 degrees Centigrade; substantially above the design operating range of the polymer. As a result, the doped polymer film 26 demonstrates a stable retention of the molecular dipole alignment throughout the design operating temperature range. Secondly, the polymer contains a high concentration of electrically sensitive dopant chromophores. Electrically sensitive dopant chromophores are highly electrooptically active, thereby achieving sufficient electrically induced density variation to accomplish the desired optical modulation within the geometric constraints of the modulator 12. The doped polymer including the foregoing parameters, when incorporated in the instant modulator 12, has demonstrated the ability to achieve sufficient depth of modulation to function as a switch as well as an amplitude modulator. The switching capability is particularly applicable to modulation by digital data, specifically where rapid transitions are necessary.

Another significant advantage of the instant invention is the ability to perform the modulation and switching at relatively low input signal voltage levels. The modulation and switching capability is achieved by the application of an electric field of a magnitude which can be developed by current TTL or ECL semiconductor devices of types presently used in computer and communication circuits. The accomplishment is achieved by use of the doped polymer 26 incorporated as a thin film in a semiconductor chip 24. When the input signals are too low to achieve the desired depth of modulation, the semiconductor chip 24 can provide amplification to the applied signal, thereby achieving appropriate electric field intensity within the doped polymer thin film 26 for desired depth of modulation.

Thin film doped polymer applications have the advantage of accepting high frequency modulating signals associated with current data rates, formerly achievable only by inefficient and expensive crystals such as lithium niobate. Another significant advantage from the use of the doped polymer 26 in a thin film application is the ability to achieve improved coupling and light launching between the external modulator 12 and the fiber optic waveguide 16 over prior art coupling. Such coupling is a result of the intimate contact between the doped polymer film 26 and the fiber optic waveguide 14, the index of refraction matching, and the tailoring of the modulator 12 geometric parameters to the applied data signal frequency and the laser optical carrier frequency.

As previously discussed, applications of communication systems using distributed modulators and battery power, used direct modulation to meet the system constraints. Because of the practical limitations of external modulation methods and materials, a separate light source and driver were required to introduce each channel of data into a fiber optic waveguide. In the instant invention, semiconductor modulator assembly 12 incorporates the thin film polymer 26 modulation means, and by virtue of maintaining efficient low loss interface between the doped polymer 26 and the fiber optic waveguide 14, can permit individual coupling from separate data channels by modulator assemblies 12 located at a multiplicity of spaced sites along a fiber optic waveguide 14 which uses a single light source 20. Such a feature permits the use of a single, uninterrupted length of fiber optic waveguide 14, thereby eliminating the losses associated with the transitions when the fiber integrity is not maintained and substantially reducing the electrical power required for operation of the communication system.

In operation, independently generated data signals are synchronously applied to each individual modulator assembly 12 through its conductive electrodes 28 bonded directly to the doped polymer film 26 or bonded to and amplified by the semiconductor cover 24 of the modulator 12. The data signal applied to the electrodes 28 creates an electric field in the doped polymer film 26 thereby causing a change in the polymer index of refraction proportional to the applied signal voltage. By virtue of the intimate contact between the doped polymer film 26 and the fiber optic waveguide 14, the change in index of refraction in the polymer film 26 causes absorption of laser energy from the optical fiber waveguide 18. The absorption produces amplitude modulation of the laser carrier as a result of the applied data signal.

Accordingly, the present invention satisfies the need for an improved electrooptical modulating system permitting multiple modulator sites in a communication system which overcomes the previously described shortcomings. While a particular form of the invention has been described in detail, changes and modifications may be made without departing from the present invention, the scope of which is limited only by the following claims.

We claim:

1. A fiber optic data communication system comprising:
   a fiber optic waveguide means wherein an optical carrier is propagated; and
   a plurality of modulation means located at intervals along and physically coupled to the fiber optic waveguide, each modulation means comprising:
   a doped polymer means on the fiber optic waveguide means, the doped polymer having an index of refraction in the quiescent state which substantially matches an index of refraction of the fiber optic waveguide and which varies with an electric field representing a data signal applied thereto for modulating the optical carrier propagated in the fiber optic waveguide; and
   an electrode means for applying the electric field to the doped polymer means in response to the data signal, whereby the optical carrier is modulated by the data signal.

2. The system of claim 1 further comprising a semiconductor means for mounting and for electrically matching the doped polymer means and the electrode means to the fiber optic waveguide means, wherein the semiconductor means comprises:
   support means for maintaining the doped polymer means in intimate contact with the fiber optic waveguide means; and
   means for mounting the electrode means to apply the electric field to the doped polymer means directly, or to the semiconductor means for transfer to the doped polymer means.

3. The system of claim 2 wherein the support means includes
   (i) means for mounting the doped polymer means and the electrode means,
   (ii) means for accepting and positioning the fiber optic waveguide means, and
   (iii) means for maintaining the doped polymer means in contact with the fiber optic waveguide means, the semiconductor means electrically matching the data signal to the doped polymer means.

4. The system of claim 2 wherein:
   the fiber optic waveguide is encased and protected by cladding in the form of a cable and a portion of the fiber optic waveguide is exposed to the doped polymer by removal of a segment of the cladding,
   the support means includes a channel for receiving the exposed portion of the fiber optic waveguide means, and
   the semiconductor means comprises:
   a semiconductor cover containing the doped polymer film means and the electrode means for covering the channel with the polymer film in contact with the fiber optic waveguide.

5. The system of claim 1 wherein the doped polymer means comprises:
   a noncentrosymmetric glassy polymer having an internal molecular structure oriented as dipoles, formed by the application of an electric field; and
   an electrooptically active chromophore dopant having a variable index of refraction dependent upon the electric field generated within the polymer by the data signal.

6. The system of claim 1 wherein the electrode means comprises a pair of conductive strips bonded to the modulation means to accept an external data signal.

7. A method for modulating an electrical data signal on an optical carrier signal carried by an optical fiber waveguide, comprising:
   (a) applying the data signal to a doped polymer in contact with the optical fiber waveguide, the doped polymer having an index of refraction which in a quiescent state substantially matches an index of refraction of the optical fiber and which varies with an electric field applied thereto, and (b) generating an electric field in the doped polymer in response to the data signal to modulate the optical signal carried by the optical fiber waveguide.

8. The method of claim 7 wherein step (a) comprises:

applying the data signal to the doped polymer through a pair of conductors bonded to the doped polymer, and wherein step (b) comprises:

(a) generating in the doped polymer an electric field which varies in magnitude as a function of the data signal, and (b) changing the index of refraction of the doped polymer as a function of the varying electric field whereby the changing index of refraction effects a modulation of the optical carrier by the data signal.

9. The method of claim 8 wherein step (a) further comprises amplifying the data signal supplied to the doped polymer in a semiconductor supporting the pair of conductors.

* * * * *